Feb. 21, 1933. J. P. GLEASON 1,898,769
DISPLAY DEVICE
Filed June 6, 1932
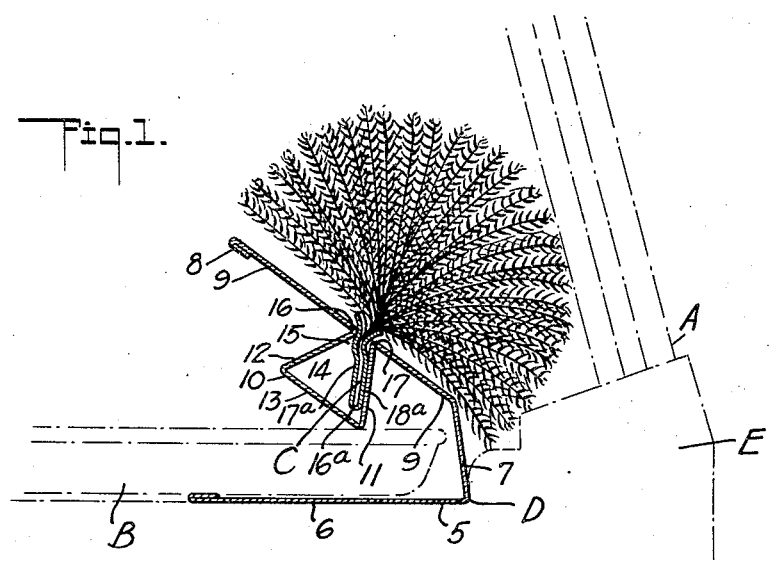
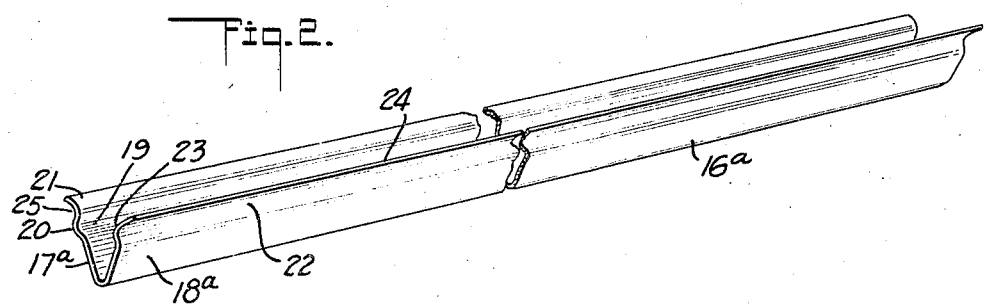
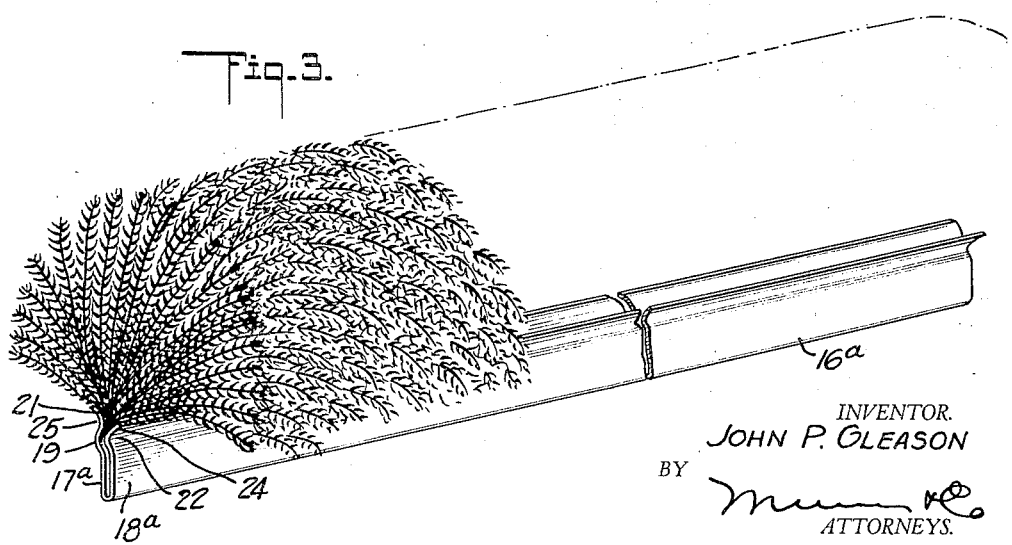
INVENTOR.
JOHN P. GLEASON
BY
ATTORNEYS.

Patented Feb. 21, 1933

1,898,769

UNITED STATES PATENT OFFICE

JOHN P. GLEASON, OF LOS ANGELES, CALIFORNIA

DISPLAY DEVICE

Application filed June 6, 1932. Serial No. 615,685.

This invention relates to display devices generally, and same is particularly, but not necessarily, designed as a holder for a non-perishable substance, the color and general appearance of which is green like parsley and adapted to be employed as a substitute for fresh parsley or other similar greens for garnishing or decorating refrigerated meat and delicatessen show cases, store fixtures or the like.

An essential object of the invention is to provide a device of the character herein set forth which, for the one purpose in mind, will be equally as attractive and ornate as parsley or the like and at the same time be entirely free of the many disadvantages which are known to attend the use of fresh parsley, such as the constant cost necessary for frequent replacement thereof, and the possibility of its being contaminated by vermin, plant lice and the like.

A further object of the invention is to provide a device of the character described which is so constructed that it may be sold at small cost and readily placed in position in the decorative order that it is intended same shall bear relative to the meat being displayed.

A still further object of the invention is to provide a device characterized by a small number of co-operable parts which may be freely separated from each other whenever desired in order to permit of quick removal of a soiled or worn portion and the substitution therefor of a clean, fresh portion, and at slight cost, and whereby the device can be readily subjected to suitable sterilizing treatment in order that it may be maintained in a highly sanitary condition.

Another object of the invention is to provide a device which is constructed so that the effective display portion thereof may be angularly adjusted to meet varying requirements, such as different types of show cases.

Other objects and advantages of the invention will be apparent from the following description, considered in conjunction with the accompanying drawing, in which:

Figure 1 is a view in transverse section through the device showing the position which same is intended to occupy when in use;

Figure 2 is a perspective view of the clip in the position same occupies before its walls are pressed into binding engagement with the root ends of the preserved plant life which I employ as a substitute for real parsley;

Figure 3 is a view similar to Figure 2, showing the form which the clip assumes when the walls thereof are pressed into binding engagement with said root ends of the plant life employed.

In carrying the invention into practice, I employ a holder 5 formed of bendable sheet steel and provided with a horizontal base wall or portion 6; an upstanding wall or portion 7; and an angularly disposed wall or portion 8, the latter characterized by ledge producing surfaces 9—9 which are connected together by a dovetailed continuation 10 of the metal from which the said holder is constructed. This dovetailed continuation 10 includes a substantially perpendicular wall 11, a wall 12 and a base or connecting wall 13, the three said walls contributing to define a longitudinally disposed groove 14, the constricted neck 15 of which opens at a point directly between the said ledges 9—9. The construction just described is such that the walls 11 and 12 merge into the respective ledges 9—9 so as to define therewith spaced apart longitudinal V-shaped ribs 16 and 17, the purpose of which will be explained presently. At A is illustrated by the dot and dash lines a portion of a show case within which I have operatively shown the position which the holder occupies with respect to a meat pan or tray B, the latter being extended over onto the base wall 6 of said holder. It is to be understood that I do not wish to be limited with respect to the proportion of the parts employed, but it is a feature of the present invention that the holders be in short lengths, say about eighteen inches, so that they may be built upon into various designs, such as borders about meat trays on display, or arranged in other attractive positions and at vantage points in the case or relative to the object to be garnished.

The clip 16ᵃ which I employ in conjunction with the holder 5 is formed from a single piece of sheet steel, bent on itself to provide walls 17ᵃ and 18ᵃ, the former having a continuous longitudinal internal groove 19, an external longitudinal bead 20 and a flared free extension 21, the latter having an external longitudinal groove 22, an internal longitudinal bead 23 and a free flared extension 24. Between these walls 17ᵃ and 18ᵃ I place the root ends C or corresponding portions of lycopodium, evergreen moss, ground pine or similar pretreated and preserved plant life, the color of which is green like parsley or other fresh greens. Lycopodium, properly treated for the purpose of the invention and for other decorative purposes, can be purchased in the open market and I of course make no claim to the method of treating such plant life to hold same in a desired state of preservation. I place bunches of this plant between said walls 17ᵃ and 18ᵃ, being careful that this is done as consistently as possible so as to provide a continuous fluffy spray of foliage from the display portion of the clip from one end of the clip to the other end thereof, where it may gracefully take the fluffy fan-like, or pompom, form shown in Figures 1 and 2, with portions spreading in many radial directions and with substantial parts overlying the respective ledges 9—9 of the circumferential holder. The said walls 17ᵃ and 18ᵃ are firmly pressed against each other and the rib 23 is thereby pressed into the groove 19 and in consequence thereof a crimp is placed in the root ends of the plant particles so as to securely hold same against accidental displacement from said clip.

The aforementioned clip 16 has a length which is coextensive with that of the holder 5, and because of the construction of these respective elements of my organization it follows that one may readily slide the clip into position between the walls 11 and 12 from either end of the said holder so that the groove 22 of the clip will be received by the rib 17 and the rib 16 extended into the external longitudinal groove 25 of the wall 17ᵃ. Also, it will be noted that the rib 20 will occupy a position directly beneath the said rib 16. It is in this manner that the clip is securely connected with the holder, yet in such way that the clip may be conveniently removed whenever desired, whether it be for replacement of parts or for the purpose of cleansing same. It will be appreciated that the walls 11 and 12 are somewhat springy, and because thereof the clip will tend to assume a perpendicular position as shown in Figure 1 so as to come into intimate contact with the substantially vertical wall 11. Incident to this novel manner of supporting the clip, the fluffy foliage of the plant fragments employed tend to fall equally to both sides of the vertical and to become equally distributed over the effective display surfaces 9—9 of the device.

The holder 5 may be bent at the point D and the angularity of the ledge surfaces 9—9 changed to suit the particular purpose, depending upon the type of show case employed or place where the device is to be used. In the illustration (Figure 1), the device is placed directly behind the front rail E of the show case A and it is because thereof that the device is bent to form the upstanding wall 7. But in instances where the device is to be used as a border around rectangular trays or the like this upstanding wall may be bent to assume such angle with respect to the wall 6 that the ledge walls 9—9 may be conveniently arranged in a horizontal position. Or, I may dispense with the wall 7 by merely bending the metal and permitting said wall to lie directly in the plane of the said ledge walls, the angle of the walls 9—9 then proceeding directly from the point of joinder thereof with said base wall 6.

A device constructed as herein set forth is simple, inexpensive and highly attractive and ornamental when on display. The plant substance which I employ will not tarnish the meat when the device is positioned inside a show case, and the organization of co-operable parts which comprise the device is such that the clip, which is in the nature of a refill, can be thrown away whenever it has outlived its usefulness and a new one substituted therefor at small expense. It may be readily separated from the holder 5 whenever it is desired to subject the border to a suitable sterilizing bath, and because of this latter desirable feature, the device may be always retained in a perfectly sanitary condition. The trouble of frequent changing of display trims necessitated by the use of natural parsley is entirely eliminated by use of the invention and the ease with which the device may be installed and removed, the continued neatness and attractiveness of appearance, and the life of the device, as compared with perishable parsley or natural greens, are all commendatory and render the device a necessity of maximum utility. The vivid, fresh green of lycopodium is kept at its best by the dry cold of the refrigerated case and the characteristic traits of this plant are such that it does not become contaminated by vermin, plant lice and the like, a feature not possible of attainment with fresh parsley.

Having thus described my invention, I claim:

1. A device for garnishing display trays for articles of food comprising an elongated member having a longitudinal groove defined by mating springy walls adapted to extend along an adjacent side wall of a display tray, a clip freely insertable in the groove and having a display portion adapted to be exposed therefrom, and a parsley-like substance carried by said clip and exposed from said member at the said display portion of the clip.

2. A device for garnishing display trays for articles of food comprising an elongated member having a longitudinal groove defined by mating springy walls adapted to extend along an adjacent side wall of a display tray, a clip freely insertable in the groove and having a display portion adapted to be exposed therefrom, and a parsley-like substance carried by said clip and exposed from said member at the said display portion of the clip, the said member having ledge forming surfaces merging into the walls of the groove at the display portion of the said clip.

3. A device of the class described comprising a member having a longitudinal groove defined by mating springy walls, a clip freely insertable in the groove and having a display portion adapted to be exposed therefrom, a parsley-like substance carried by said clip and exposed from said member at the said display portion of the clip, the said member having ledge forming surfaces merging into the walls of the groove at the display portion of the said clip, and a supporting wall forming a continuation of one of said ledge walls.

4. A device for garnishing display trays for articles of food comprising an elongated clip, bunches of lycopodium exposed from an edge portion of the clip, and means co-operable with the clip and from which said bunches of lycopodium may be displayed in a continuous row along one side of a tray.

5. A device for garnishing display trays for articles of food comprising an elongated clip, bunches of fluffy green preserved plant life carried by the clip, and means for supporting said clip in a position along one side of a correlated tray and including an angularly adjustable portion to mount same in different angular positions.

6. A device for garnishing display trays for articles of food comprising a clip, bunches of fluffy green preserved plant life carried by the clip, and arranged in a straight row formation along one edge thereof, and means for supporting said clip and including an angularly adjustable portion to mount same in different angular positions, said bunches producing the effect of a pom-pom in transverse section through the clip.

7. A device of the class described comprising a clip, fluffy material carried by the clip, and a holder separable from the clip for displaying said fluffy material, the clip having grooved and beaded portions respectively, and means on the holder co-operable with said grooved and beaded portions to hold the clip in a relatively fixed position on the holder.

8. A device of the class described comprising a holder formed with a groove having a rigid wall, a clip insertable in the groove, means forming a part of the holder for pressing the clip against said rigid wall, and fluffy material carried by the clip and exposed from said groove.

9. The combination, with a holder having a base and a portion spaced apart and superposed relatively thereto and connected thereto along one side thereof and defining therewith a space adapted to receive a portion of of display tray, of a parsley colored substance carried by the aforestated portion of said holder.

10. As a new article of manufacture, garnishing material having stem portions; and an elongated clip from which said material is displayed; the clip including mating clamping walls between which the aforementioned stem portions are interposed; said walls being pressed firmly into engagement with said stem portions to permanently attach said material to said clip.

11. As a new article of manufacture a garnishing device comprising an elongated clip adapted to be arranged contiguous with and parallel to a side of a display tray; a substance simulating fresh greens secured to said clip in a position to be displayed therefrom in continuous row formation along one edge of the clip to provide a section of a decorative border for a tray when said clip is arranged as aforestated; and means for supporting said clip to display said substance as aforestated.

JOHN P. GLEASON.